Aug. 28, 1951 — J. H. PADEN ET AL — 2,566,227
PREPARATION OF MELAMINE
Filed March 20, 1947
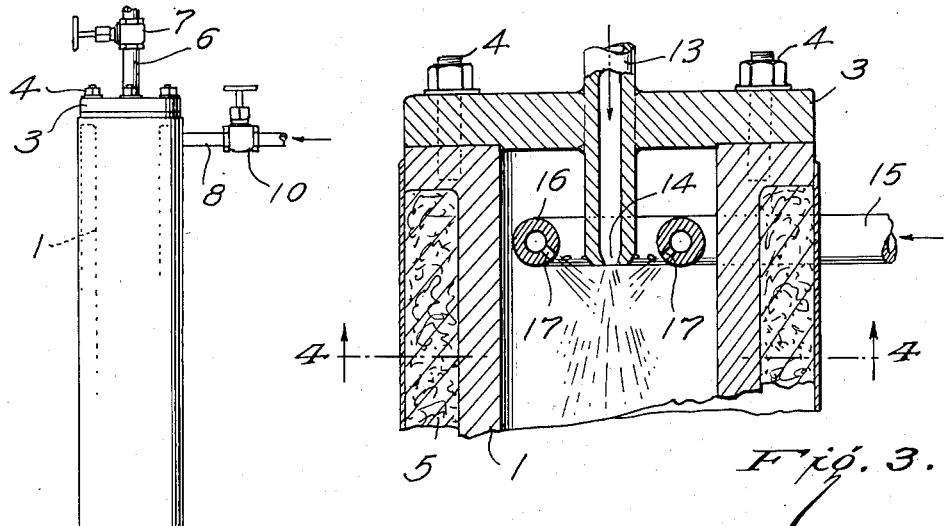
Fig. 3.
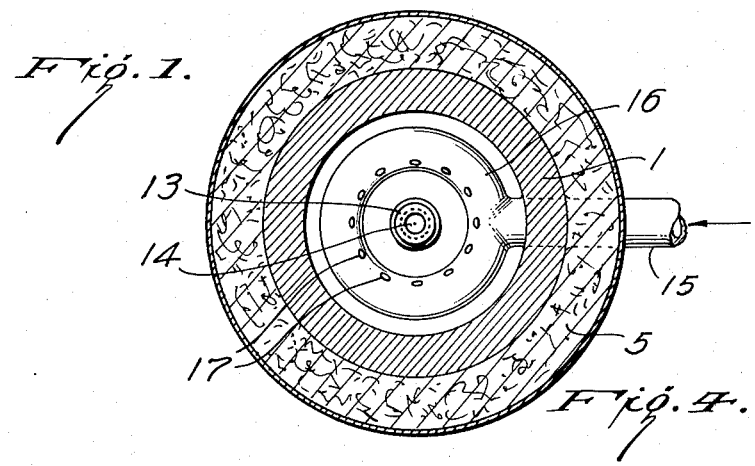
Fig. 1.
Fig. 4.
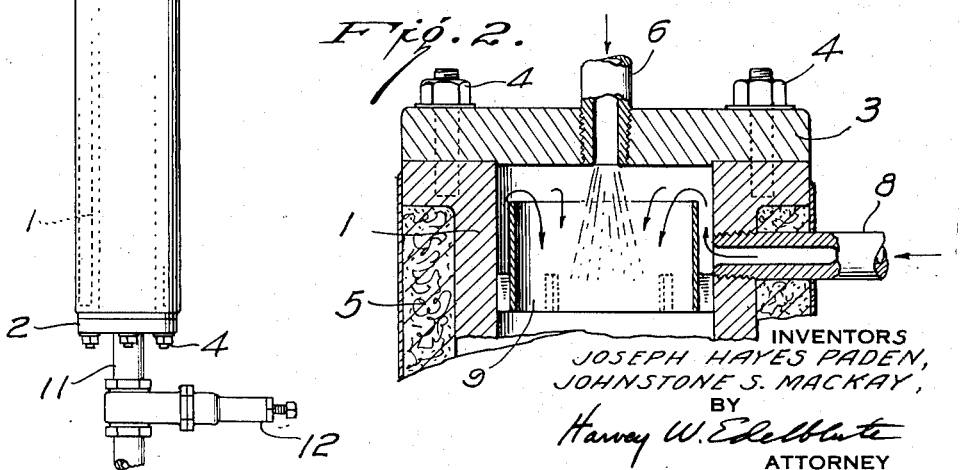
Fig. 2.
INVENTORS
JOSEPH HAYES PADEN,
JOHNSTONE S. MACKAY,
BY
Harvey W. Edelblute
ATTORNEY Patented Aug. 28, 1951

2,566,227

UNITED STATES PATENT OFFICE 2,566,227

PREPARATION OF MELAMINE

Joseph H. Paden, Stamford, and Johnstone S. Mackay, Old Greenwich, Conn., assignors to American Cyanamid Company, New York, N. Y., a corporation of Maine Application March 20, 1947, Serial No. 736,072

9 Claims. (Cl. 260—249.5)

This invention relates to an improved process and apparatus for the production of melamine.

In our co-pending application, Serial Number 495,216, filed July 17, 1943, of which this is a continuation-in-part, it is disclosed that urea and other substances such as guanylurea, biuret, cyanuric acid, ammeline, ammelide, and the like can be converted into melamine when heated with ammonia at temperatures of about 300° C. and preferably higher. Dicyandiamide and other melamine forming substances can also be converted to melamine at these high temperatures.

A convenient way of carrying out the aforesaid process is to prepare a solution in liquid ammonia of the melamine forming substance; urea, dicyandiamide or the like, and pass the solution through a tube heated from the outside to such temperatures that the reaction is complete while the solution is passing therethrough. The solution of melamine forming substance in liquid ammonia may be slightly preheated but this cannot be carried too far, particularly when using such quick converting substances as dicyandiamide, in view of the fact that the reaction takes place before the solution reaches the reaction zone and melamine is formed which tends to deposit on the walls of the system and prevent passage of the solution.

In order to attain the high temperatures necessary for best operation, that is from about 400 to 550° C., a considerable amount of heat must be passed through the tube forming the reaction zone. In doing this a number of difficulties have been encountered. Because of the lack of turbulence in the gases flowing in the reaction tube, particularly when using tubes of large diameters, it is not always possible to maintain an evenly high temperature throughout the system. As a result, some of the gases in the center of the tube may not become hot enough. Increasing the temperature of the tube leads to overheating of other parts of the system. These difficulties are particularly apparent when using reaction tubes over about 1½″ in diameter. As a result, the process has been limited to relatively small size reaction tubes, thus cutting down the capacity of the system.

Other difficulties which arise when attempting to heat the reaction through the reaction tube are due to local hot spots that may develop in the system. Deposits of deamination products of melamine may form and build up to such an extent that even flow is prevented. In other areas the temperature may be such that melamine is condensed on the surface of the apparatus and likewise prevents flow of materials through the reaction tube. These conditions may also occur because of uneven flow of the incoming materials so that the removal of heat from the walls of the tube is uneven which results in an undesirable fluctuation in the temperature of the reaction zone.

Another disadvantage of the old method lies in the fact that some materials of construction are adversely affected by the high temperatures necessary when it is required to heat the reaction zone through the material forming the walls thereof.

We have found that the process of preparing melamine from melamine forming materials by heating at high temperatures in the presence of ammonia can be greatly improved by supplying the principal heat requirements of the reaction through the medium of heated ammonia. In this new process a solution of the melamine forming substance in ammonia is formed and, if desired, preheated to temperatures below those required for the formation of melamine. This solution is then mixed with a sufficient quantity of heated ammonia so that the resulting mixture has a temperature of from about 400 to 550° C. whereby the melamine forming substance is converted to melamine which may then be removed from the reaction vessel with the excess ammonia. The condensed melamine is then separated from the ammonia which may be reheated and reintroduced into the system.

In order that the invention may be more clearly understood reference is made to the drawings in which:

Figure 1 is an elevation of an apparatus for conducting the process;

Figure 2 is a vertical section of the upper part of the apparatus showing a desirable means of introducing the melamine forming material and the heated ammonia to the system;

Figure 3 is a similar view of the same part of the apparatus but illustrates a variation in the construction thereof; and Figure 4 is a transverse sectional view taken on line 4—4 of Figure 3 in the direction indicated by the arrows.

Referring to Figure 1, it will be found that the apparatus consists essentially of a tube 1 of stainless steel or other corrosion resistant material that can stand temperatures at which the process is operated. Caps 2 and 3 may be bolted as at 4, or welded, to the ends of the tube forming an elongated reaction chamber. The apparatus may be insulated as shown at 5, or provided with a jacket, not shown, so that a heated fluid may flow therethrough to provide extra heat if desired. The inlet, line 6, through which the melamine forming substances may be introduced into the reaction chamber is positioned at one end of the apparatus. A suitable valve 7 is provided to regulate the flow of materials into the reaction zone. Another inlet, line 8, through which hot ammonia may be introduced into the reaction chamber is also provided near the point of entry through which the melamine forming substances are forced into the reaction zone. A baffle 9 (Fig. 2) may be provided to divert the incoming flow of ammonia somewhat in the direction shown by the arrows. A suitable valve 10 is also provided in line 8 so that the flow of hot ammonia may be controlled. An outlet, line 11, with an automatic pressure release valve 12 is provided at the opposite end of the apparatus to release the melamine and hot ammonia gases therefrom.

The gases from the apparatus may enter a cyclone separator (not shown) or other suitable device whereby the melamine is condensed and separated from the hot ammonia. The latter substance may then be recompressed, reheated, and recycled through the system as required.

Means of mixing the melamine forming substance and the hot ammonia may vary. One such modification of the apparatus is shown in Figures 3 and 4. In this the melamine forming substance is introduced in solution or molten form, as the case may be, through line 13 which may be constricted at the outlet to form a nozzle as shown at 14. The incoming hot ammonia is introduced through line 15 to an annular distributing ring 16 having suitable orifices 17 which tend to direct the hot ammonia gases against nozzle 14. Such an arrangement tends to prevent the build-up of deposits of melamine, melam, or the like on the nozzle. It is pointed out in connection with this modification of the apparatus that line 13 should not extend too far into the reaction zone in view of the possibility of premature melamine formation and resulting plugging of the line.

To operate the new process and the apparatus just described a solution of melamine forming substance in liquid ammonia is prepared. When using dicyandiamide as the melamine forming substance the solution will contain from about 20% to about 50% or more by weight of dicyandiamide. When using urea as the melamine forming substance the solution may be more concentrated and contain up to about 75% by weight or more of urea. In fact, it is even possible to introduce the urea into the system in molten form.

The solution of melamine forming substance may be at room temperature or, preferably, slightly preheated to temperatures below those required for melamine formation, not more than about 100° to 150° C. in the case of dicyandiamide but higher when using urea. The ammonia is preheated to a temperature 50 to 100° higher than the temperature desired in the reaction zone. This exact temperature will vary somewhat with the amount of ammonia added to the system and the fact that the melamine forming reaction is sometimes exothermic in nature. As we prefer to add about ten pounds of ammonia to the system for each pound of melamine forming substance, the temperature of the incoming ammonia will generally be from about 500 to 600° C. It will be understood, of course, that either more or less ammonia, a ratio of from about 6 to 1 to 15 to 1, may be added to the system but that it is necessary that enough be added so that the heat input into the system is sufficient to bring the temperature in the reaction zone up to the desired levels.

The reaction zone should be maintained within the range 400° C. to 550° C. and, preferably, from about 450° C. to 500° C.

At the high temperatures of the reaction the conversion of melamine forming substances to melamine takes place rather rapidly, in fact, in a matter of seconds. When using dicyandiamide, it is desirable, however, to retain the reactive gases in the reaction zone for a slightly longer period in order to allow reconversion of melam, melem, and other demaniation products which may form, back to melamine. Accordingly, the length of the reaction chamber and the flow of gases will be such that the total time in the reaction zone is from about five to thirty seconds. When using dicyandiamide, a retention period of from about ten to fifteen seconds is preferred. When using the slower melamine-forming urea, the retention period will be longer.

The process is preferably conducted within the pressure range of from about 750 to 5000 pounds per square inch. Under most of these operating conditions the melamine that is formed exists in the vapor phase, although some may be present in the liquid form at the higher pressures. We prefer to operate the apparatus so that the pressure is between 1,500 and 2,000 pounds per square inch at the temperature range mentioned above.

We claim:

1. A method which comprises the steps of bringing into intimate contact with a solution of dicyandiamide in ammonia an additional quantity of ammonia heated to 500 to 600° C. whereby the resulting mixture has a temperature within the range 400 to 550° C., and a pressure within the range 750 to 5000 p. s. i. whereupon melamine is formed, and then cooling the reaction mixture and separating melamine from ammonia.

2. A method which comprises the steps of mixing together in a pressure resistant vessel a solution of dicyandiamide in ammonia with sufficient additional ammonia at a temperature of from about 500° to 600° C. whereby the resulting mixture has a temperature within the range 400 to 550° C. and a pressure within the range 750 to 5,000 pounds per square inch, whereupon melamine is formed, and thereafter separating melamine from the ammonia.

3. A method which comprises the steps of mixing together in a pressure resistant vessel a solution of dicyandiamide in ammonia with sufficient additional ammonia at a temperature of from about 500° to 600° C. whereby the resulting mixture has a temperature within the range 450° to 500° C. and a pressure within the range 750 to 5,000 pounds per square inch, whereupon melamine is formed, and thereafter separating melamine from the ammonia.

4. A method which comprises the steps of forcing a solution of dicyandiamide in ammonia at a temperature not in excess of about 150° C. into a reaction vessel maintained at a pressure from about 750 to 5,000 pounds per square inch, and heating the said solution by the simultaneous addition of ammonia at a temperature above 450° C. so that a temperature within the range 400° to 550° C. is maintained within the reaction vessel, and thereafter removing melamine and ammonia from said reaction vessel.

5. A method which comprises the steps of forcing a solution of about 20% to 50% by weight of dicyandiamide in ammonia at a temperature not in excess of about 150° C. into a reaction vessel maintained at a pressure within the range 750 to 5,000 pounds per square inch while simultaneously adding a sufficient quantity of ammonia at a temperature of 500° C. to 600° C. to maintain the temperature within the reaction vessel within the range 400° to 550° C., and thereafter, within a period of from about five to thirty seconds, removing ammonia and the melamine that has formed therein.

6. A method which comprises the steps of bringing molten urea into direct contact with a stream of ammonia heated at a temperature within the range 500° to 600° C. whereby the urea is heated to within the range 400° C. to 550° C. and melamine is formed, and thereafter recovering the melamine.

7. A method which comprises mixing a stream of urea dissolved in liquid ammonia within a separate stream of ammonia at a higher temperature in a reaction chamber maintained at a pressure within the range 750 to 5,000 pounds per square inch, the temperature of the ammonia gases being sufficient to raise the temperature of the urea solution up to within the range 400° to 550° C., and recovering melamine from the resulting reaction.

8. A method of preparing melamine which comprises the steps of forcing a preheated solution of urea in liquid ammonia into a pressure resistant vessel maintained at a pressure of at least 750 pounds per square inch and simultaneously introducing into said pressure vessel ammonia heated to a temperature of at least 450° C. whereby the urea is heated to at least 400° C. and melamine is formed, and thereafter recovering the said melamine.

9. A method of preparing melamine which comprises the steps of forcing a melamine-forming substance comprising a member of the group consisting of urea and dicyandiamide at a temperature below that at which melamine is formed into a pressure resistant vessel maintained at a pressure of at least 750 p. s. i. and simultaneously introducing into said pressure vessel ammonia heated to a temperature in excess of 450° C. whereby the melamine-forming substance is heated to within the range of 400° to 550° C. and melamine is formed, and thereafter recovering the said melamine.

JOSEPH H. PADEN.
JOHNSTONE S. MACKAY.

REFERENCES CITED

The following references are of record in the file of this patent:

UNITED STATES PATENTS

| Number | Name | Date |
|---|---|---|
| 2,164,705 | Fisch | July 4, 1939 |
| 2,312,751 | Davy | Mar. 2, 1943 |
| 2,396,193 | Paden | Mar. 5, 1946 |

FOREIGN PATENTS

| Number | Country | Date |
|---|---|---|
| 524,349 | Great Britain | 1940 |